(12) United States Patent
Nam et al.

(10) Patent No.: US 9,893,923 B2
(45) Date of Patent: Feb. 13, 2018

(54) METHOD FOR TRANSMITTING AND RECEIVING QAM SIGNAL IN FILTER BANK-BASED MULTICARRIER COMMUNICATION SYSTEM, AND APPARATUS THEREFOR

(71) Applicants: Samsung Electronics Co., Ltd., Gyeonggi-do (KR); INDUSTRY-ACADEMIC COOPERATION FOUNDATION YONSEI UNIVERSITY, Seoul (KR)

(72) Inventors: Hyungju Nam, Seoul (KR); Sooyong Choi, Seoul (KR); Yeohun Yun, Hwaseong-si (KR); Moonchang Choi, Seoul (KR); Seongbae Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/505,244

(22) PCT Filed: Aug. 19, 2015

(86) PCT No.: PCT/KR2015/008648
§ 371 (c)(1),
(2) Date: Feb. 20, 2017

(87) PCT Pub. No.: WO2016/028077
PCT Pub. Date: Feb. 25, 2016

(65) Prior Publication Data
US 2017/0272293 A1 Sep. 21, 2017

(30) Foreign Application Priority Data
Aug. 19, 2014 (KR) .................. 10-2014-0107996

(51) Int. Cl.
*H04L 27/26* (2006.01)
*H04L 25/03* (2006.01)

(52) U.S. Cl.
CPC .... *H04L 27/264* (2013.01); *H04L 2025/0342* (2013.01)

(58) Field of Classification Search
CPC .................. H04L 2025/0342; H04L 27/264
See application file for complete search history.

(56) References Cited

U.S. PATENT DOCUMENTS 8,743,982 B2 * 6/2014 Bellanger ........... H04L 27/2652
375/130
2005/0271152 A1 12/2005 Kim et al.
(Continued)

FOREIGN PATENT DOCUMENTS

KR 10-2008-0015786 A 2/2008

OTHER PUBLICATIONS

Hyungju Nam, "A new filter-bank multicarrier system for QAM signal transmission and reception," The 2014 IEEE International Conference on Communication (ICC 2014), Jun. 14, 2014, 7 pages, Sydney, Australia.
(Continued)

*Primary Examiner* — Freshteh N Aghdam

(57) ABSTRACT

Disclosed is a 5G or pre-5G communication system to be provided for supporting a data transfer rate higher than that of a 4G communication system, such as LTE, and subsequent systems. The present invention relates to a method for transmitting and receiving a QAM signal in a filter bank-based multicarrier communication system, and an apparatus therefor. Particularly, the present invention provides an efficient transmission and reception method and apparatus capable of obtaining high performance in the transmission of a QAM signal without intrinsic interference in a multi-path delay channel environment in a filter bank-based multicarrier communication system. Accordingly, the present invention relates to a transmission method in a filter bank-based multicarrier (FBMC) communication system, and an apparatus therefor, the method comprising the steps of: spreading each of two QAM signals divided into a plurality of groups to a plurality of signals on a frequency axis; intersecting at
(Continued)

least one signal, which is overlapped with a spread signal of an adjacent QAM signal among the plurality of spread signals, with the spread signal of the adjacent QAM signal; filtering, by each of the plurality of groups, the plurality of spread signals of which at least one signal has been intersected; and transmitting the plurality of filtered spread signals by being overlapped on a time axis.

20 Claims, 15 Drawing Sheets

(56) References Cited

U.S. PATENT DOCUMENTS

| | | |
|---|---|---|
| 2009/0290602 A1 | 11/2009 | Mcneely |
| 2012/0189036 A1 | 7/2012 | Bellanger |
| 2014/0321524 A1* | 10/2014 | Kim .................... H04L 27/2647 375/232 |
| 2016/0204822 A1* | 7/2016 | Yu ............................ H04B 1/40 375/219 |
| 2016/0269217 A1* | 9/2016 | Nam ....................... H04L 27/34 |
| 2016/0301554 A1* | 10/2016 | Dore ....................... H04B 1/16 |

OTHER PUBLICATIONS

Alphan Sahin, "A Survey on Prototype Filter Design for Filter Bank Based Multicarrier Communications," Proceedings of CoRR, Dec. 14, 2012, 29 pages.

* cited by examiner

EXISTING SYSTEM

EXISTING SYSTEM

FIG. 6
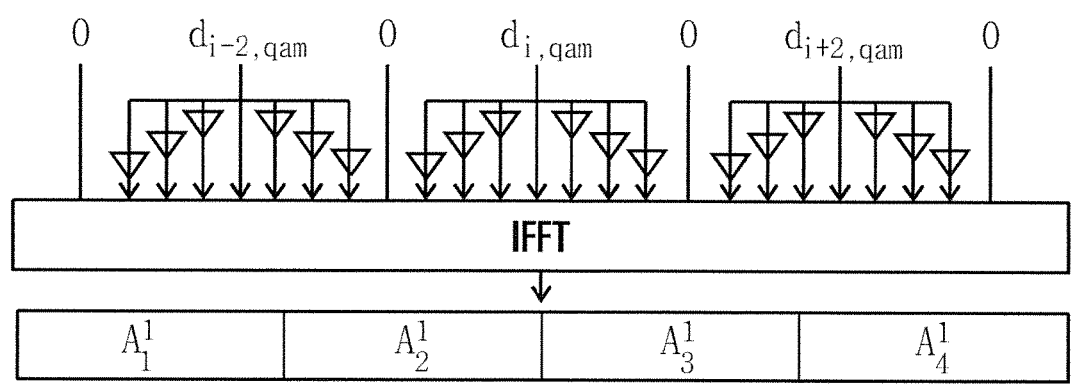
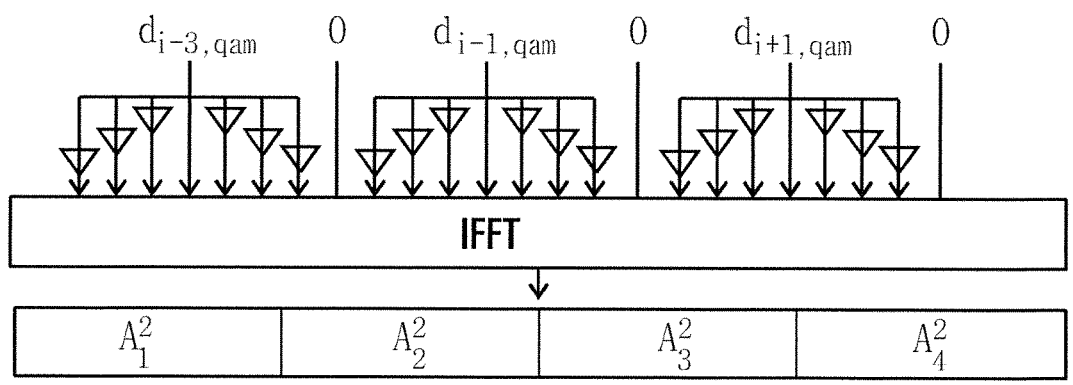

EXISTING SYSTEM

EXISTING SYSTEM

FIG. 10
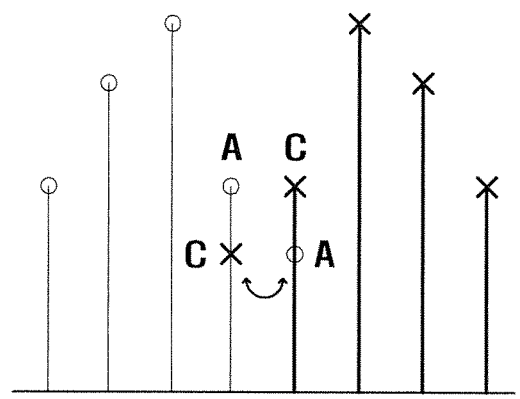
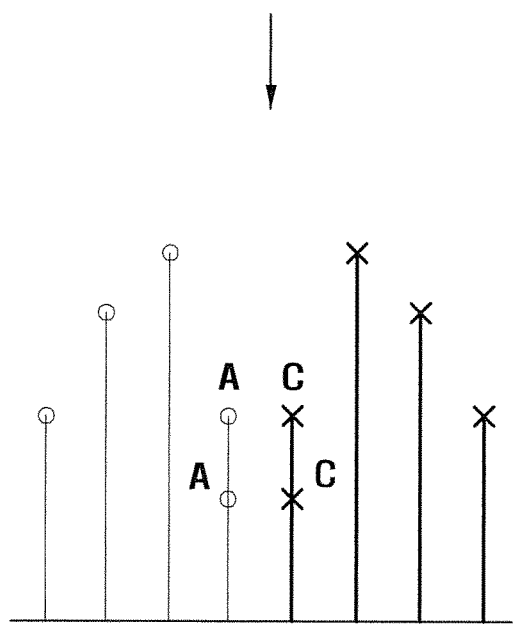

FIG. 11
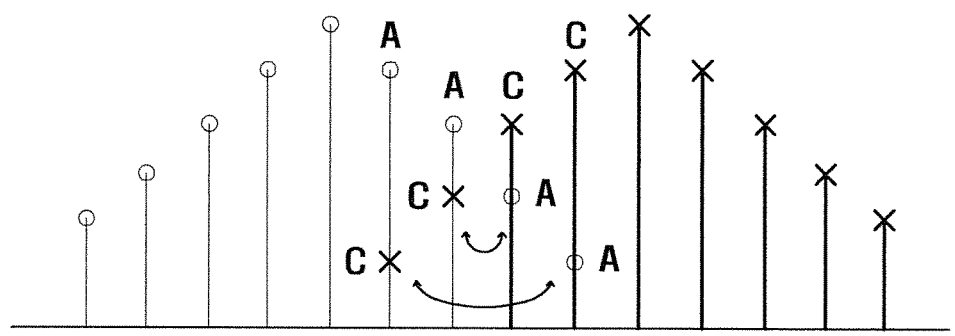
H₄ H₃ H₂ H₁ H₀ H₁ H₂ H₃ H₄
   G₄ G₃ G₂ G₁ G₀ G₁ G₂ G₃ G₄
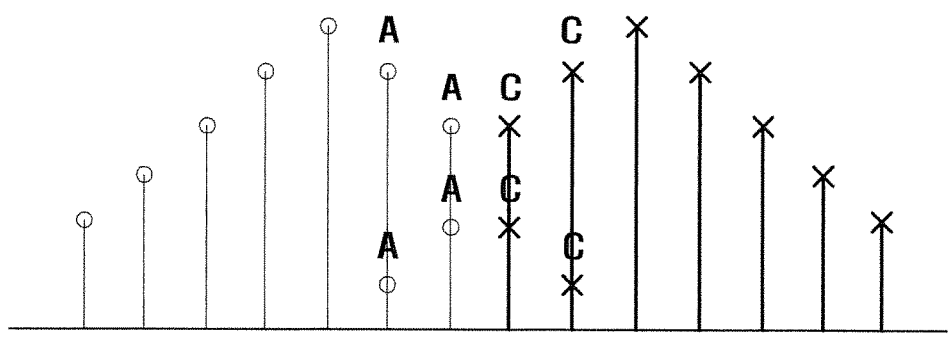
H₄ H₃ H₂ H₁ H₀ H₁ H₂ H₃ H₄
   G₄ G₃ G₂ G₁ G₀ G₁ G₂ G₃ G₄

METHOD FOR TRANSMITTING AND RECEIVING QAM SIGNAL IN FILTER BANK-BASED MULTICARRIER COMMUNICATION SYSTEM, AND APPARATUS THEREFOR

CROSS-REFERENCE TO RELATED APPLICATION(S)

The present application claims priority under 35 U.S.C. §365 to International Patent Application No. PCT/KR2015/008648 filed Aug. 19, 2015, entitled "METHOD FOR TRANSMITTING AND RECEIVING QAM SIGNAL IN FILTER BANK-BASED MULTICARRIER COMMUNICATION SYSTEM, AND APPARATUS THEREFOR" and, through Korea Patent Application No. 10-2014-0107996 filed Aug. 19, 2014, each of which are incorporated herein by reference into the present disclosure as if fully set forth herein.

TECHNICAL FIELD

The present invention relates to a method and apparatus for transmitting/receiving QAM signals in a Filter Bank Multicarrier (FBMC) communication system. More specifically, the present invention relates to a method and apparatus for transmitting/receiving QAM signals in an FMBC communication system, in a multi-path delay channel environment, efficiently, with high performance.

BACKGROUND ART

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.'

In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc.

In order to improve system networks for 5G communication systems, various technologies have been developed, e.g.: evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, etc.

In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

DISCLOSURE OF INVENTION

Technical Problem

The present invention provides a method and apparatus capable of: preventing the occurrence of intrinsic interference caused as filtering signals of an odd sub-carrier and an even sub-carrier are overlapped; and applying an FBMC to a QAM signal, using a filter of a complex domain, thereby providing the performance of spectrum higher than an existing OFDM and FBMC-QAM system.

Solution to Problem

In accordance with an aspect of the present invention, a transmission method of a Filter Bank Multicarrier (FBMC) communication system is provided. The transmission method includes: spreading each of at least two QAM signals, divided into a number of groups, to a number of signals in the frequency domain; intersecting at least one signal, overlapping with spread signals of adjacent QAM signals among the spread signals, with the spread signals of the adjacent QAM signals; filtering, according to the groups, the spread signals at least one of which is intersected; and overlapping the filtered, spread signals each other in the time domain, and transmitting the signals.

In accordance with another aspect of the present invention, a reception method of a Filter Bank Multicarrier (FBMC) communication system is provided. The reception method includes: dividing received signals into a number of groups; filtering the signals divided into groups; and equalizing the filtered result in the frequency domain and retrieving at least one or two Quadrature Amplitude Modulation (QAM) signals. The received signal is created by the following: spreading each of at least two QAM signals, divided into a number of groups, to a number of signals in the frequency domain; intersecting at least one signal, overlapping with spread signals of adjacent QAM signals among the spread signals, with the spread signals of the adjacent QAM signals; filtering, according to the groups, the spread signals at least one of which is intersected; and overlapping the filtered, spread signals each other in the time domain, and transmitting the signals.

In accordance with another aspect of the present invention, a transmission apparatus of a Filter Bank Multicarrier (FBMC) communication system is provided. The transmission apparatus includes: a filtering unit for: spreading each of at least two QAM signals, divided into a number of groups, to a number of signals in the frequency domain; intersecting at least one signal, overlapping with spread signals of adjacent QAM signals among the spread signals, with the spread signals of the adjacent QAM signals; and filtering, according to the groups, the spread signals at least one of which is intersected; and a communication unit for overlapping the filtered, spread signals each other in the time domain, and transmitting the signals.

In accordance with another aspect of the present invention, a reception apparatus of a Filter Bank Multicarrier (FBMC) communication system is provided. The reception apparatus includes: a communication unit for receiving signals; a filtering unit for dividing the received signals into a number of groups and filtering the signals divided into groups; and an equalizer for equalizing the filtered result in the frequency domain and retrieving at least one or two Quadrature Amplitude Modulation (QAM) signals. The received signal is created by the following: spreading each of at least two QAM signals, divided into a number of groups, to a number of signals in the frequency domain; intersecting at least one signal, overlapping with spread signals of adjacent QAM signals among the spread signals, with the spread signals of the adjacent QAM signals; filtering, according to the groups, the spread signals at least one of which is intersected; and overlapping the filtered, spread signals each other in the time domain, and transmitting the signals.

Advantageous Effects of Invention

The transmission and reception methods according to the present invention are capable of: transmitting QAM signals in an FBMC system, with preventing the occurrence of intrinsic interference in symbols in an FBMC transmission system; and thus allowing the FBMC system to use a QAM-based MIMO technique.

The transmission and reception methods according to the present invention are capable of: implementing a filtering process, via a weighted sum, in the time domain, using the repetition property of IFFT and FFT; and thus decreasing the degree of complexity.

The transmission and reception methods according to the present invention are capable of: transmitting QAM signals; guaranteeing the performance of a multi-path delay environment; and decreasing side-lobes, compared with an existing system.

BRIEF DESCRIPTION OF DRAWINGS

FIG. 6 is a diagram that describes the flow of signals in a transmission apparatus of an FBMC-QAM communication system.

FIGS. 10 and 11 are diagrams that describe a method of transmitting/receiving QAM signals according to the present invention.

MODE FOR THE INVENTION

Figure 1:
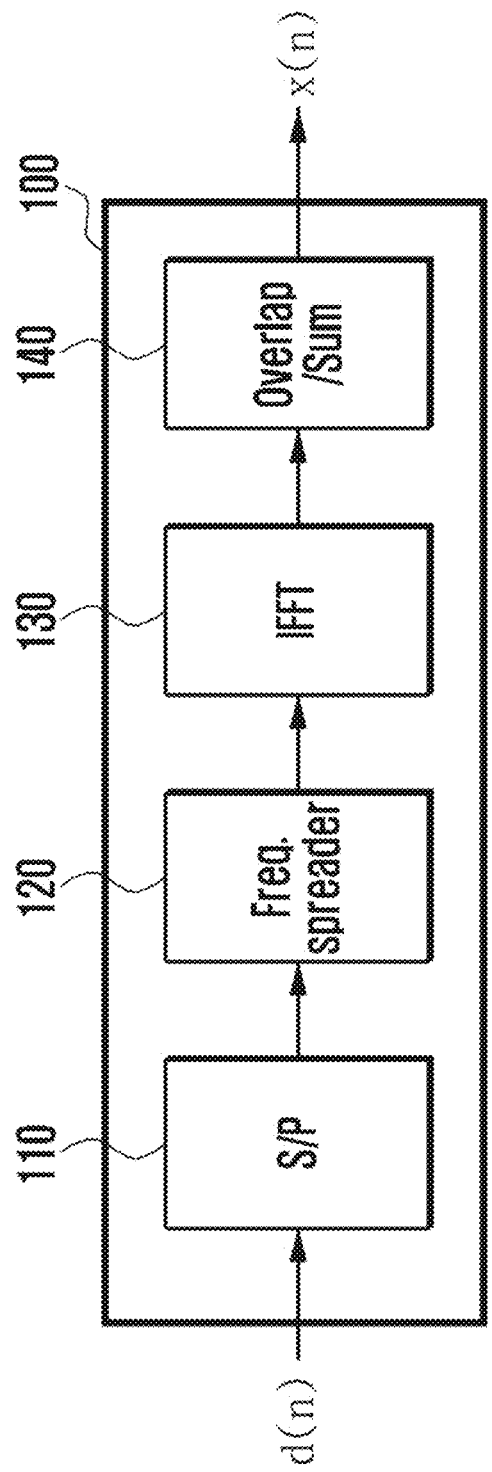
FIG. 1 is a block diagram showing a transmission apparatus of an existing FBMC communication system.

Embodiments of the present invention are described in connection with a transmission apparatus and a reception apparatus. The term 'transmission apparatus' and 'reception apparatus' may also be called a system, a subscriber unit, a subscriber station, a mobile station, a mobile, a remote station, a remote terminal, a mobile device, a user terminal, a terminal, a wireless communication device, a user agent, a user device, user equipment (UE), etc. Examples of the transmission apparatus and the reception apparatus are a cellular phone, a Personal Digital Assistant (PDA), a handheld device with wireless access capability, a computing device, other process devices connected to a wireless modem, etc.

The technical terms used in describing various embodiments of the present disclosure are only examples for describing a specific embodiment but do not limit ideas of the present invention. Unless defined differently, the technical terms have the same meaning as that understood by a person skilled in the art to which the present disclosure belongs. The terms as those defined in a generally used dictionary are to be interpreted to have the meanings equal to the contextual meanings in the relevant field of art, and are not to be interpreted to have ideal or excessively formal meanings unless clearly defined in the present description.

As used herein, the singular forms are intended to include the plural forms as well, unless expressly stated otherwise. It should be understood that the expressions "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the invention are described in detail with reference to the accompanying drawings. Detailed descriptions of well-known functions and structures incorporated herein may be omitted to avoid obscuring the subject matter of the invention. The following terms are defined considering functions according to the invention, and may be changed by users or operators according to their needs. Therefore, the terms will be defined throughout the content of the present disclosure.

In order to achieve high-quality data transmission at a high speed, a study has recently been made on a Filter Bank Multicarrier Communication (FBMC) system as the next generation communication technology capable of substituting for the Orthogonal Frequency Division Multiplexing (OFDM) transmission technology. FBMC generates radiation of a relatively low frequency band (out-of-band radiation), compared with the OFDM, and thus reduces the number of guard subcarriers for satisfying the same spectrum mask, compared with the OFDM. FBMC may modulate and demodulate signals without a cyclic prefix (CP), and may increase the frequency spectral efficiency, so that it has advantageous characteristics against a frequency synchronization error.

Existing FBMC communication systems are classified into (1) a method of performing transmission/reception by applying a poly-phase network (PPN) in the time domain after IFFT and (2) a method of performing transmission/reception by applying the architecture of an overlap/sum and a frequency spreader in the frequency domain before IFFT. The technique, described as in item (1), implements offset-QAM (OQAM) in such a way that: convolution in the frequency domain using a PPN is implemented with a filtering configured with a sum of weighted sums of a length of M in the time domain; and two PPN modules are applied thereto based on a time difference. In this case, the transmitting end performs a time domain filtering, and thus the receiving end uses a time domain equalizer. The technique, described as in item (2), performs oversampling in the frequency domain before IFFT, filtering by a prototype filter, IFFT of a length of KM, and overlay transmission using an adder and a memory. In this case, the transmitting end performs filtering in the frequency domain, and thus the receiving end performs a frequency domain one-tap equalizer.

In recent years, in order to overcome an uppermost limit an FBMC system using OQAM, (3) an FBMC-QAM technique has been developed that: splits carries into even sub-carriers and odd sub-carriers; filters the even sub-carriers and odd sub-carriers respectively, maintaining the orthogonality of individual filtering operations; and performs transmission of QAM signals. The FBMC-QAM technique interleaves an existing prototype filter in the time domain and secures the orthogonality between the even sub-carrier filter and the odd sub-carrier filter, thereby transmitting QAM signals without intrinsic interference. In this case, the receiving end retrieves signals using a frequency domain one-tap equalizer.

Since existing FBMC communication systems overlap filtering between adjacent data for the techniques described as in items (1) and (2), they need to use OQAM signals, instead of QAM signals. Therefore, existing FBMC communication systems have difficulty using QAM-based techniques and being combined with multiple-input and multiple-output (MIMO).

The FBMC-QAM architecture according to the technique, described as in item (3), interleaves a filter in the time domain in order to secure the orthogonality of the filter, and thus has a limit, such as a worse level of spectrum performance than existing OFDM systems.

In the following description, embodiments are explained in detail.

Figure 2:
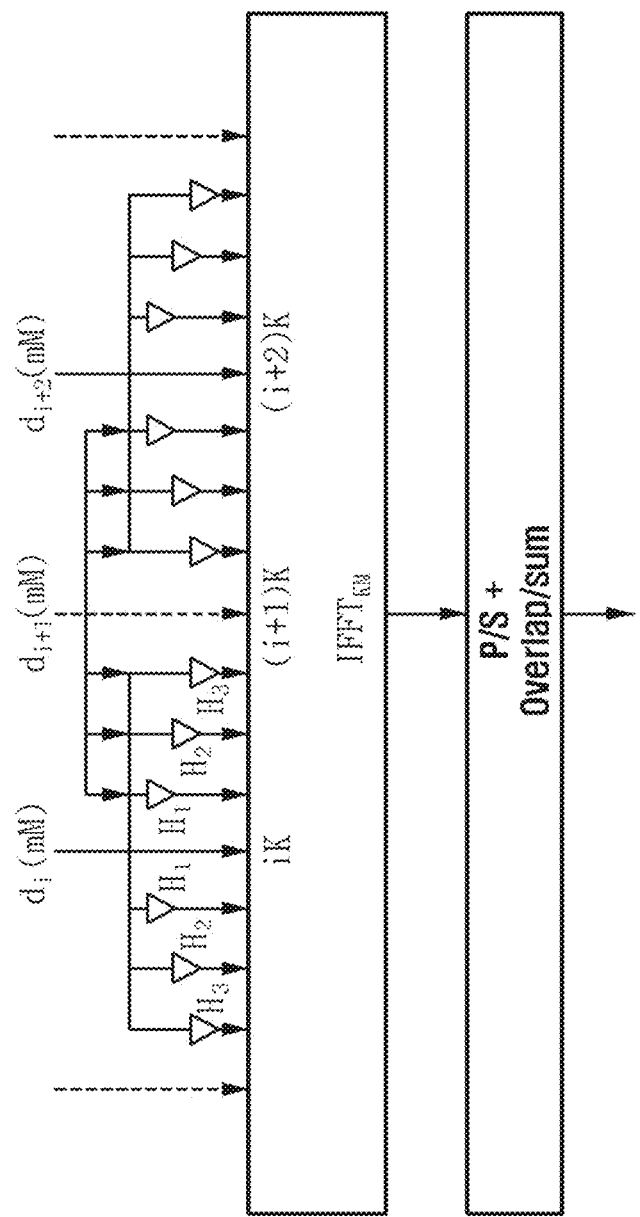
FIG. 2 is a diagram that describes the flow of signals in a transmission apparatus of an existing FBMC communication system.

FIG. 1 is a block diagram showing a transmission apparatus of an existing FBMC communication system. FIG. 2 is a diagram that describes the flow of signals at K=4 in a transmission apparatus of an existing FBMC communication system.

With reference to FIG. 1, transmission signal, d(n), (which may be one FBMC symbol), may be configured with Offset Quadrature Amplitude Modulation (OQAM) signal, d(mM), the number of which is M, as shown in FIG. 2. OQAM signals are converted by an Serial-to-Parallel (S/P) converter 110. The converted OQAM signals di(mM) are spread in the frequency domain by a frequency spreader 120, as shown in FIG. 2. The frequency spreader 120 multiplies each OQAM signal by frequency domain filter coefficients of 2K−1, using a prototype filter, and thus spreads the entire OQAM signal to signals of KM over the entire frequency bandwidth. This is called frequency spreading, filtering, or oversampling.

Figure 3:
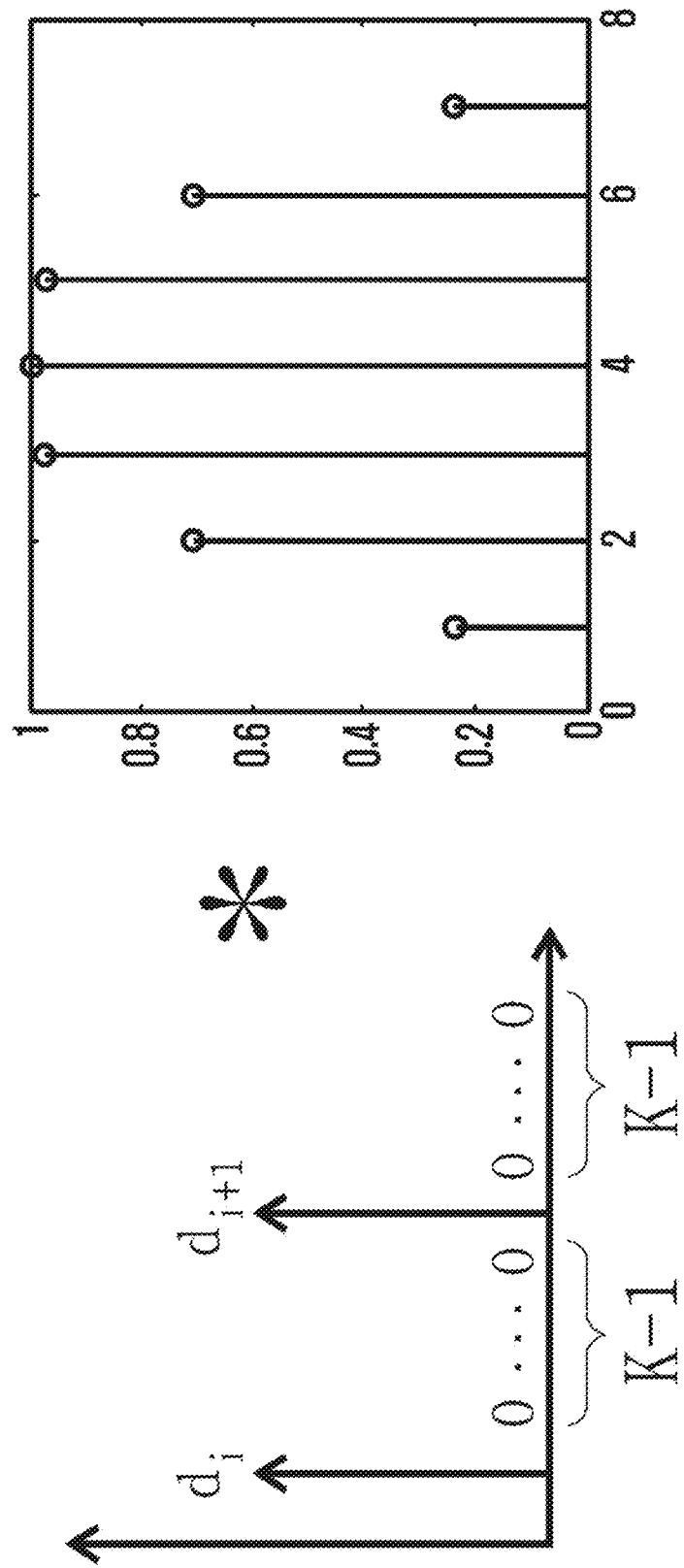
FIG. 3 shows diagrams that describes a filtering process of an existing FBMC communication system, in the frequency domain.

The filtering process is performed in such a way as to: insert zeros of K−1 between OQAM signals in the frequency domain, as shown in the left diagram of FIG. 3; and perform convolution with frequency domain filter coefficients forming a prototype filter as shown in the right diagram of FIG. 3.

Filtered signals are processed in an IFFT process by an inverse fast Fourier transform (IFFT) 130. The signals output from the IFFT 130 are processed in an overlap process by a Parallel-to-Serial (P/S) and Overlap/sum block 140, and then the processed signals are transmitted. In this case, the filtered signals are transmitted via adjacent sub-carriers, respectively.

In order to perform a frequency domain filtering, an existing FBMC system needs to overlap a spread result between adjacent QAM signals during the spreading process, and this causes interference between symbols. In this case, the existing FMB system cannot retrieve signals. In order to prevent this problem, the existing FBMC system uses OQAM which arranges an in-phase (real) component and a quadrature-phase (imaginary) component so that the components are intersected in a time-frequency resource.

In addition, in order to perform a frequency domain filtering in an existing FBMC system, the IFFT 130 needs to increase the size by K times an overlapping factor of a prototype filter, compared with the OFDM, and this causes the increases in the degree of complexity of the entire system. This problem also appears in the reception apparatus. Therefore, the reception apparatus needs to increase the size of the FFT by K times, and this thus causes the increase in the degree of complexity.

Figure 4:
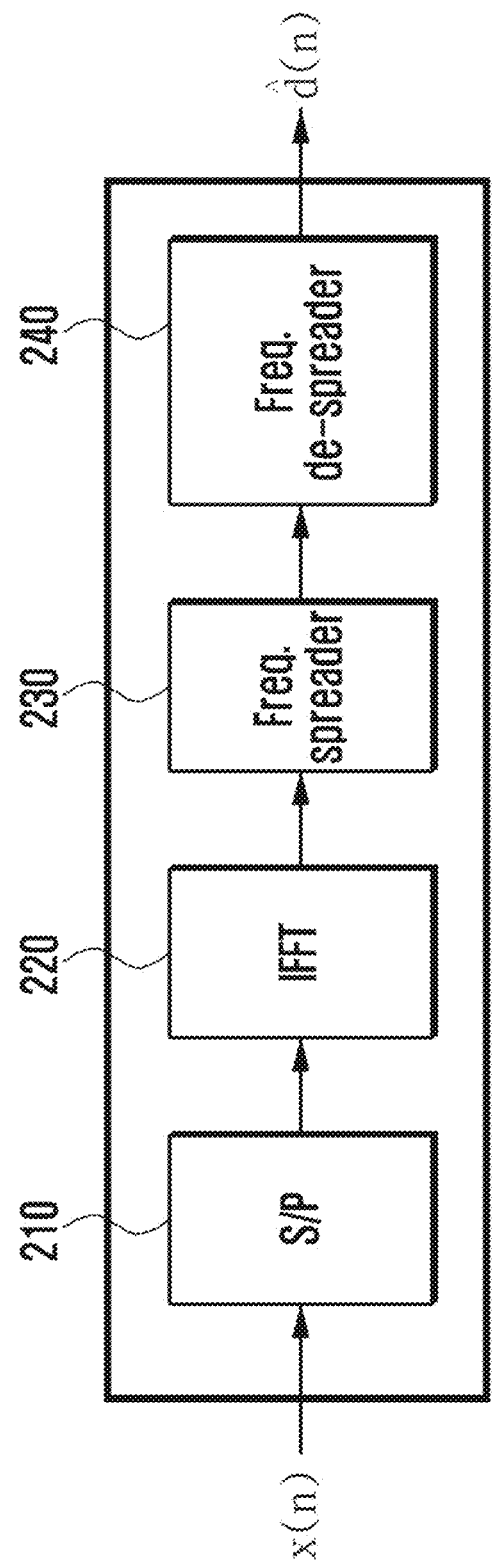
FIG. 4 is a block diagram showing a reception apparatus of an existing FBMC communication system.

FIG. 4 is a block diagram showing a reception apparatus of an existing FBMC communication system.

With reference to FIG. 4, reception signals, x(n), are converted into parallel signals by an S/P converter 210. The parallel signals are processed in a Fourier transform process by a fast Fourier transform (FFT) 220. The transformed signals are equalized by a frequency equalizer 230. The equalized signals are processed to be retrieved in a frequency domain filtering by a frequency de-spreader 240. If the frequency domain filtering process uses QAM signals, a problem that intrinsic interference is not removed arises.

In order to resolve the problem, an FBMC-QAM technique has recently been developed. The FBMC-QAM technique is described in detail below.

Figure 5:
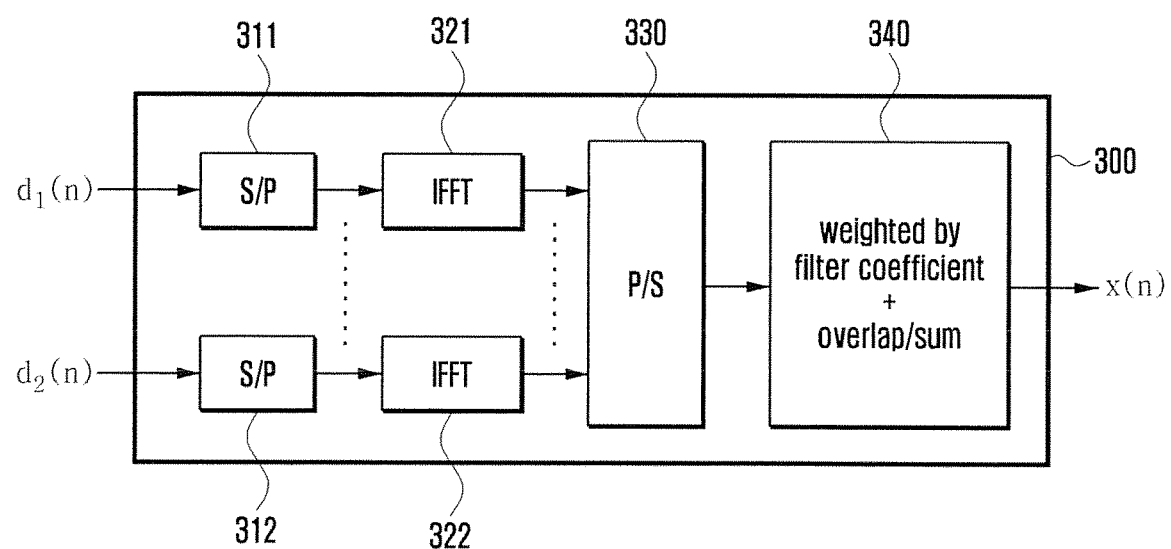
FIG. 5 is a block diagram showing a transmission apparatus of an FBMC-QAM communication system.

FIG. 5 is a block diagram showing a transmission apparatus of an FBMC-QAM communication system.

With reference to FIG. 5, a transmission apparatus 300 of an FBMC-QAM communication system includes a number of S/P converters 311 and 312 and a number of IFFTs 321 and 322. The S/P converters 311 and 312 and the IFFTs 321 and 322 are capable of participating in filtering QAM signals.

As shown in FIG. 6, the transmission apparatus 300 of the FBMC-QAM communication system divides QAM signals of M in to a first group and a second group and performs the filtering operations for the groups, respectively. In this case, the transmission apparatus 300 may divide QAM signals of M into two groups of signals which have even indexes and odd indexes. In addition, the transmission apparatus 300 of the FBMC-QAM communication system performs the weighted sum operation as a unit of 2K blocks in the time domain via a P/S converter 330 and an overlap/sum block 340. As shown in FIG. 6, the transmission apparatus overlaps IFFT output blocks for the first group and the second group, e.g., IFFT output blocks for even signal and odd signals, and transmits the overlapped result.

Figure 7:
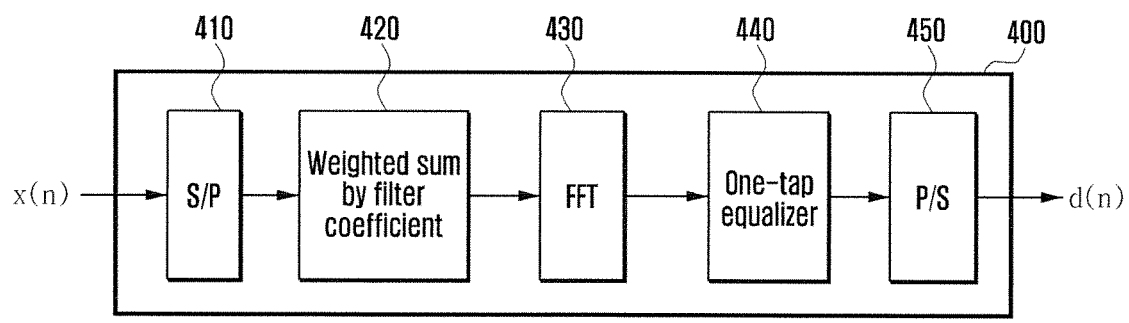
FIG. 7 is a block diagram showing a reception apparatus according to the present invention.

FIG. 7 is a block diagram showing a reception apparatus according to the present invention.

With reference to FIG. 7, a reception apparatus 400 of an FBMC-QAM communication system obtains signals received via a communication unit. The received signals are processed via an S/P converter 410, a weighted sum block 420 and an FFT 430. The processed signals are further processed in a one-tap equalization in the frequency domain by a one-tap equalizer 440. After that, the received signals are processed by a P/S converter 450, and then retrieved as final signals.

In the following description, problems caused by intrinsic interference in an existing FBMC communication system are explained in detail.

Figure 8:
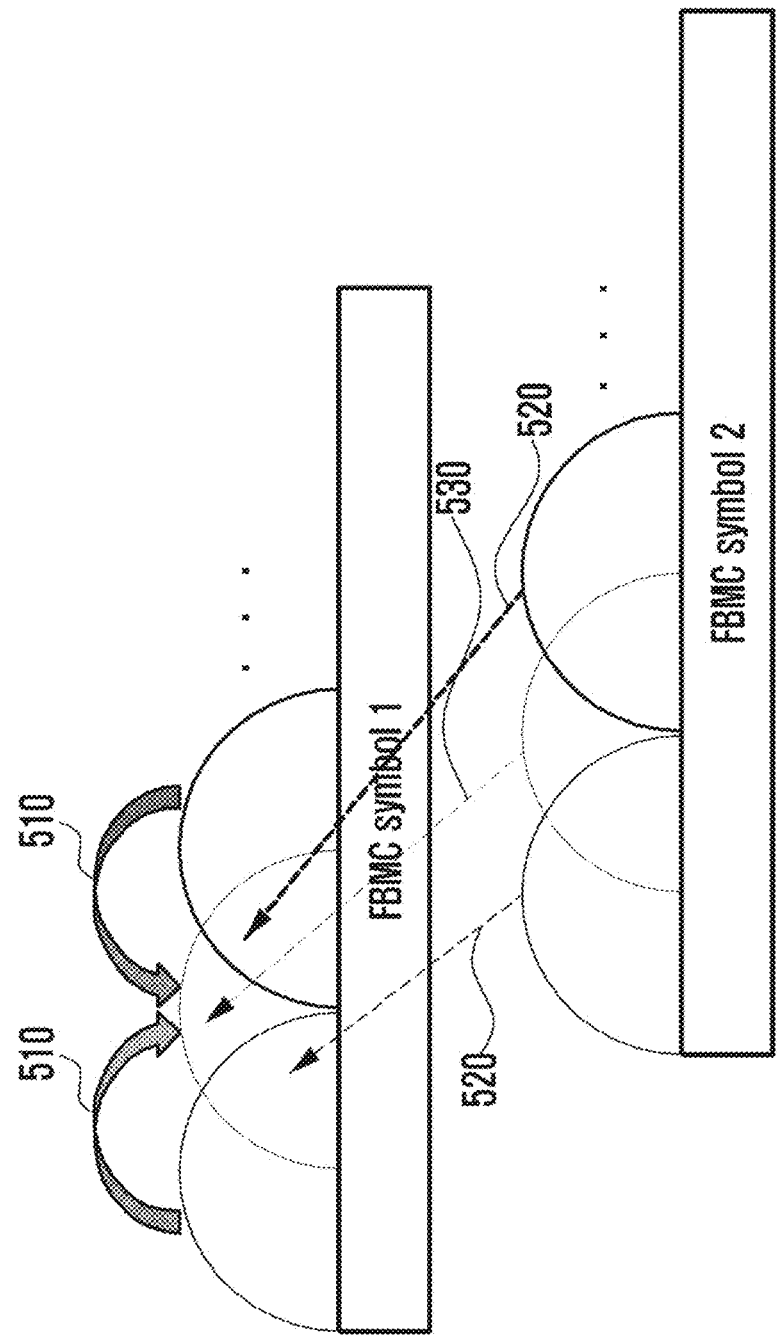
FIG. 8 is a diagram that describes interference due to the overlay transmission between sub-carriers in an existing FBMC system.

FIG. 8 is a diagram that describes interference due to the overlay transmission in an existing FBMC system. More specifically, FIG. 8 is a diagram that describes interference affecting a specified one of the adjacent sub-carriers for transmitting signals which are filtered and overlapped by arbitrarily sampled symbols in an existing FBMC system.

With reference to FIG. 8, when one FBMC symbol is filtered and the filtered signals are overlapped and transmitted via adjacent sub-carriers (adjacent bands), the overlapping in the same FBMC symbol causes interference 510 between adjacent band signals.

When a number of different FBMC symbols are filtered and the filtered signals are overlapped and transmitted via adjacent sub-carriers, a signal transmitted via a sub-carrier is affected by interference 520 from adjacent band signals of another FBMC symbol and interference 530 from the same band signal.

The magnitude of interference 510 between adjacent band signals in the same FBMC symbol is the largest, and then the magnitude of interference 530 from the same band signal of different FBMC symbols is the next largest.

Theoretically, there is no filter that can remove all types of interference described above and maximize the energy confinement and the frequency efficiency in the time and frequency domains, while maintaining the filter orthogonality. Therefore, a filtering technique is needed which is capable of minimizing a relatively large magnitude of interference 510 between adjacent band signals in the same FBMC symbol and then a magnitude of interference 530 from the same band signal of different FBMC symbols is the next largest.

Figure 9:
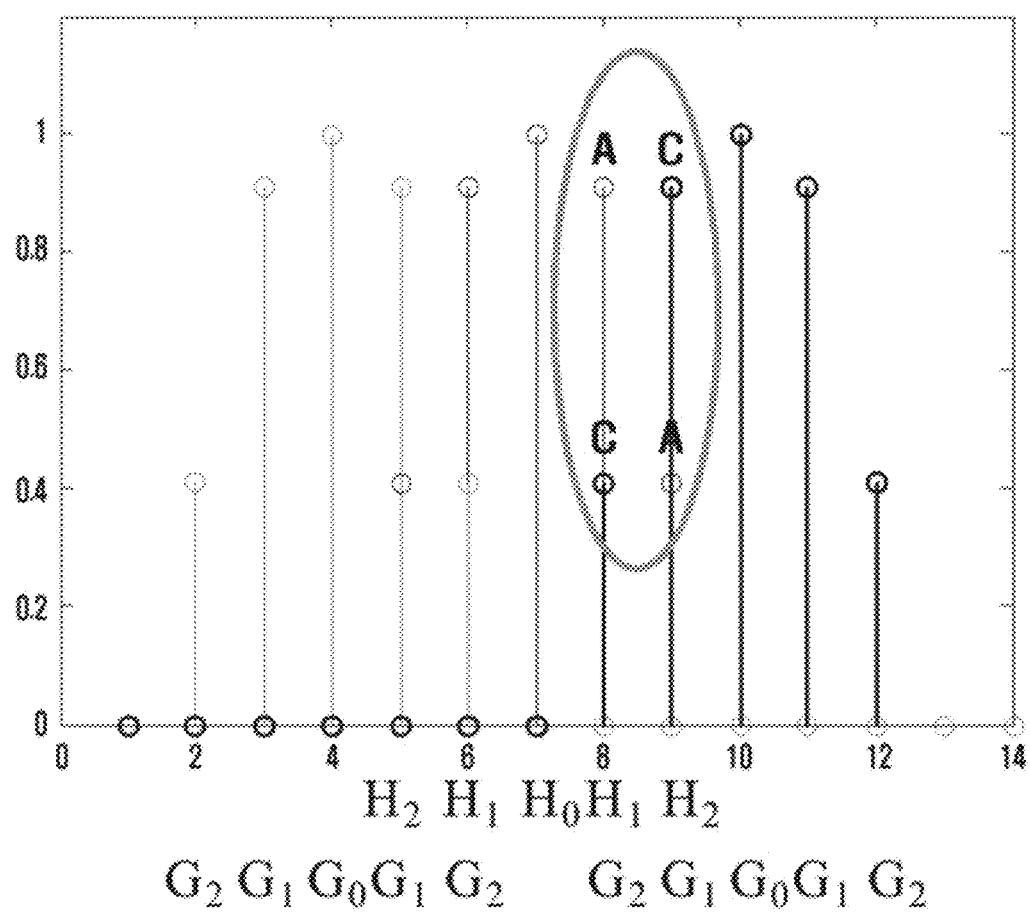
FIG. 9 is a diagram that describes interference due to the overlay transmission between sub-carriers in an existing FBMC-OQAM system.

FIG. 9 is a diagram that describes interference due to the overlay transmission between sub-carriers in an existing FBMC-OQAM system. More specifically, FIG. 9 is a graph that describes interference when a frequency spreader of an existing FBMC-OQAM system transmits signals at K=3.

With reference to FIG. 9, each OQAM signal before IFFT is multiplied by frequency domain filter coefficients of 2K−1 and is spread (filtered or oversampled) to values of KM. During the frequency spread, adjacent filtered signals are overlapped.

If a filter in the real domain is only used for all filtered signals, interference occurs between adjacent filtered signals. Therefore, the filter cannot retrieve signals, using complex data, since this is caused due to mutual interference. In order to retrieve signals, the FBMC-OQAM system uses OQAM transmission where a signal is divided into a real signal and an imaginary signal and the signals are transmitted.

The filtering of FBMC-OQAM is expressed as follows.

The filter of an even sub-carrier is defined as $H=[H_2\ H_1\ H_0\ H_1\ H_2]$. The filter of an odd sub-carrier is defined $G=[G_2\ G_1\ G_0\ G_1\ G_2]$. The filtered signals, which do include signals filtered using the zero$^{th}$ filter coefficient, are overlapped and transmitted as shown in FIG. 9. Therefore, overlapped signals after filtering even sub-carrier A and odd sub-carrier C are expressed by $[AH_1+CG_2AH_2+CG_1]$.

At the receiving end, signals after performing a matched filtering are expressed by $H^*$: $[A|H_1|^2+CG_2H_1^*A|H_2|^2+CG_1H_2^*]$ for even sub-carriers and $G^*$: $[C|G_2|^2+AH_1G_2^*C|G_1|^2+AH_2G_1^*]$ for odd sub-carriers. The second component in the each expression corresponds to interference since it is related to a signal other than the original transmitted signal.

Therefore, interference due to overlay transmission exists in the receiving end when it retrieving signals.

FIGS. 10 and 11 are diagrams that describe a method of transmitting/receiving QAM signals according to the present invention.

In order to resolve a problem related to interference that occurs since filtered signals are overlapped, embodiments of the present invention intersects at least part of the components, overlapping spread signals of the adjacent QAM signals among the spread signals of QAM signals, with the spread signals of the adjacent QAM signals. Embodiments of the present invention apply a filter of complex relation to an even sub-carrier signal and an odd sub-carrier signal, respectively. Embodiments of the present invention are capable of preventing the occurrence of intrinsic interference although adjacent signals are filtered and transmitted with overlap. A detailed description is explained as follows.

In various embodiments of the present invention, as described above in the embodiment referring to FIG. 6, QAM signals of M, as input signals, are divided into a number of groups, and the groups are filtered respectively. In this case, adjacent QAM signals may be classified into groups that differ from each other. For example, QAM signals of M may be divided into a first group of signals with even indexes and a second group of signals with odd indexes.

The groups perform filtering processes respectively as follows.

QAM signals are spread (oversampled) to signals of 2K−1 in the frequency domain. FIG. 10 show a filtering process at K=3. FIG. 11 show a filtering process at K=5. In the following description, it should be understood that the technical features of the present invention may also be applied to various alternatives or modifications employing K values, within the spirit and scope of the present invention.

In embodiments of the present invention, at least part of the spread signals, overlapping adjacent signals, are intersected with spread signals of the adjacent signals in the frequency domain. For example, at least part of the spread signals, which do not include spread signals filtered via the zero$^{th}$ filter coefficient, are intersected with at least part of the spread signals of adjacent symbols, which do not include spread signals filtered via the zero$^{th}$ filter coefficient. If the adjacent signals are classified into groups that differ from each other, mutually intersected adjacent signals may be signals classified into groups that differ from each other.

In this case, at least part of the intersected spread signals may be signals from index (K+1)/2 to index K−1. With reference to FIG. 10, a spread signal whose index is (K+1)/2=K−1=2 is intersected with spread signals of the adjacent signals. With reference to FIG. 11, spread signals whose index is from (K+1)/2=3 to K−1=4 are intersected with spread signals of the adjacent signals.

At least part of the spread signals overlapping with adjacent symbols may be intersected with spread signals of adjacent symbols according to a preset rule. In various embodiments of the present invention, at least part of the spread signals overlapping with adjacent symbols may be intersected with spread signals of adjacent symbols with the same index. With reference to FIG. 10, a spread signal whose index is 2 is intersected with a spread signal whose index is 2 from among the spread signals of adjacent symbols. With reference to FIG. 11, a spread signal whose index is 3 is intersected with a spread signal whose index is 3 from among the spread signals of adjacent symbols. In addition, a spread signal whose index is 4 is intersected with a spread signal whose index is 4 from among the spread signals of adjacent symbols.

Although the embodiment is described in such a way that at least part of the spread signals is intersected with another signal based on a preset rule, it should be understood that the present invention is not limited to the embodiment. For example, it may be modified in such a way that at least part of the spread signals is intersected with another signal using various methods capable of minimizing interference in symbols.

Intersected spread signals are filtered by filters according to groups of QAM signals. In embodiments of the present invention, filters applied to individual groups have complex relation. That is, filter coefficients of a filter applied to a second group may be created as a modulus for filter coefficients of a filter applied to a first group. For example, if coefficients of a filter applied to a first group are created in the real domain, coefficients of a filter applied to a second group may be created in the complex domain.

In the embodiment with reference to FIG. 10, the filter applied to a first group of even sub-carriers is $H=[H_2\ H_1\ H_0\ H_1\ H_2]$ in the real domain. The filter applied to a second group of odd sub-carriers is $G=[G_2\ G_1\ G_0\ G_1\ G_2]=[jH_2\ jH_1\ jH_0\ jH_1\ jH_2]$ in the complex domain.

When filter coefficients of complex domain are used as described above, overlapped signals after filtering even sub-carrier A and odd sub-carrier C are expressed by $[AH_1+AG_2CH_2+CG_1]$.

At the receiving end, signals after performing a matched filtering are expressed by $H^*$: $[A|H_1|^2+AG_2H_1{}^*C|H_2|^2+CG_1H_2{}^*]$ for even sub-carriers and $G^*$: $[A|G_2|^2+AH_1G_2{}^*C|G_1|^2+CH_2G_1{}^*]$ for odd sub-carriers.

Since $G_2H_1{}^*=-H_1G_2{}^*$ and $G_1H_2{}^*=-H_2G_1{}^*$, when the first value of the $H^*$ and the first value of the $G^*$ are summed up in order to retrieve signals, interference is removed and thus the original signal A is retrieved. Similarly, the second value of the $H^*$ and the second value of the $G^*$ are summed up, interference is removed and thus the original signal C is retrieved. In this case, like an existing FBMC filter whose coefficients defined in the real domain are designed to secure the orthogonality between overlapped signals, the complex domain filter according to the embodiment of the present invention is designed to have the orthogonality. Therefore, the embodiment of the present invention is implemented in such a way as to: intersect at least part of the spread signals with spread signals of the adjacent QAM signals; and apply different filters with complex relation to groups of QAM signals respectively, thereby removing interference 510 between adjacent band signals in the same FBMC symbol, and interference 530 from the same band signal in different FBMC symbols, as described above in the embodiments with reference to FIGS. 8 and 9.

Although the embodiment describes the filtering process in such a way as to perform a process of intersecting spread signals and a process of applying filter coefficients, it may be modified with a single process, i.e., a process of applying a filter to QAM signals.

Figure 12:
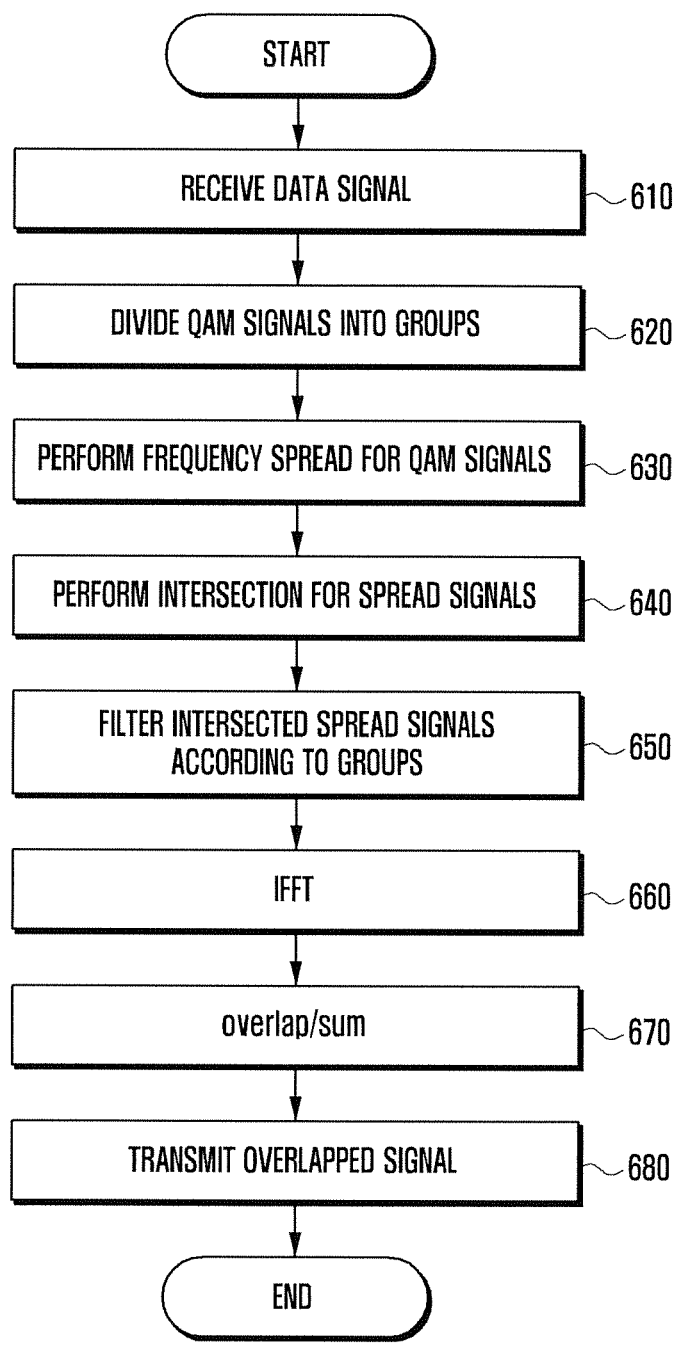
FIG. 12 is a flowchart that describes a method of transmitting QAM signals according to the present invention.

FIG. 12 is a flowchart that describes a method of transmitting QAM signals according to the present invention.

With reference to FIG. 12, a transmission apparatus according to the present invention receives data signals created as QAM signals (or symbols) of M (610).

The transmission apparatus divides QAM signals of M into a number of groups (620). In the embodiment, the transmission apparatus may divide QAM signals of M into first and second groups. In this case, the transmission apparatus divides QAM signals of M into two groups of signals with an even sub-carrier index and an odd sub-carrier index.

The transmission apparatus perform the frequency spread for individual QAM signals (630). The transmission apparatus spreads (oversamples) each of the QAM signals to signals of 2K−1 in the frequency domain.

The transmission apparatus performs the intersecting process for the spread signals (640). In the embodiment, the transmission apparatus intersects at least part of the spread signals, overlapping with adjacent signals, with spread signals of adjacent symbols in the frequency domain. For example, the transmission apparatus intersects at least part of the spread signals, which do not include spread signals filtered via the zero$^{th}$ filter coefficient, with at least part of the spread signals of adjacent symbols, which do not include spread signals filtered via the zero$^{th}$ filter coefficient. If the adjacent signals are classified into groups that differ from each other, mutually intersected adjacent signals may be signals classified into groups that differ from each other.

In this case, at least part of the intersected spread signals may be signals from index (K+1)/2 to index K−1. In addition, at least part of the spread signals overlapping with adjacent symbols may be intersected with spread signals of adjacent symbols according to a preset rule. In various embodiments of the present invention, at least part of the spread signals overlapping with adjacent symbols may be intersected with spread signals of adjacent symbols with the same index.

The transmission apparatus filters the intersected spread signals according to groups (650). In the embodiment of the present invention, filters applied to individual groups have complex relation. That is, filter coefficients of a filter applied to a second group may be created as a modulus for filter coefficients of a filter applied to a first group. For example, if coefficients of a filter applied to a first group are created in the real domain, coefficients of a filter applied to a second group may be created in the complex domain. Therefore, the transmission apparatus filters individual groups by applying different filters having complex relation thereto.

The transmission apparatus transforms the filtered signals by applying inverse fast Fourier transform (IFFT) thereto (660), and overlaps the transformed signals in the time domain by applying an overlap/sum process thereto (670).

The transmission apparatus transmits the overlapped signals to a reception apparatus via the communication unit (680).

Figure 13:
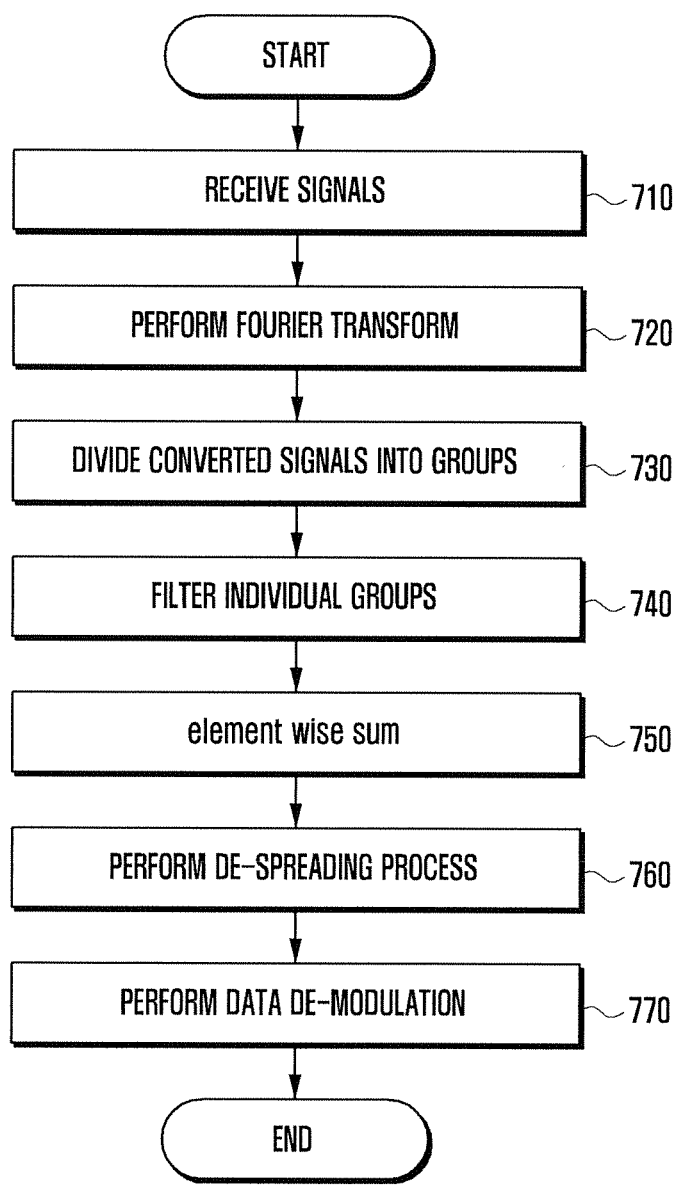
FIG. 13 is a flowchart that describes a method of receiving QAM signals according to the present invention.

FIG. 13 is a flowchart that describes a method of receiving QAM signals according to the present invention.

With reference to FIG. 13, a reception apparatus according to the present invention receives signals from the transmission apparatus (710).

The reception apparatus transforms the received signals by applying fast Fourier transform (FFT) thereto (720), and divides the transformed signals into a number of groups (730). In the embodiment, the reception apparatus may divide the received signals into first and second groups. In this case, the reception apparatus may divide the received signals into two groups of signals with an even index and an odd index.

The reception apparatus filters individual groups (740). In the embodiment of the present invention, filters applied to individual groups have complex relation. That is, filter coefficients of a filter applied to a second group may be created as a modulus for filter coefficients of a filter applied to a first group. For example, if coefficients of a filter applied to a first group are created in the real domain, coefficients of a filter applied to a second group may be created in the complex domain. Therefore, the reception apparatus filters individual groups by applying different filters having complex relation thereto.

The reception apparatus removes noise components via an element-wise sum (750), restores frequency domain modulation signals via a de-spreading process (760), and retrieves the original signals via a data de-modulation process (770).

Figure 14:
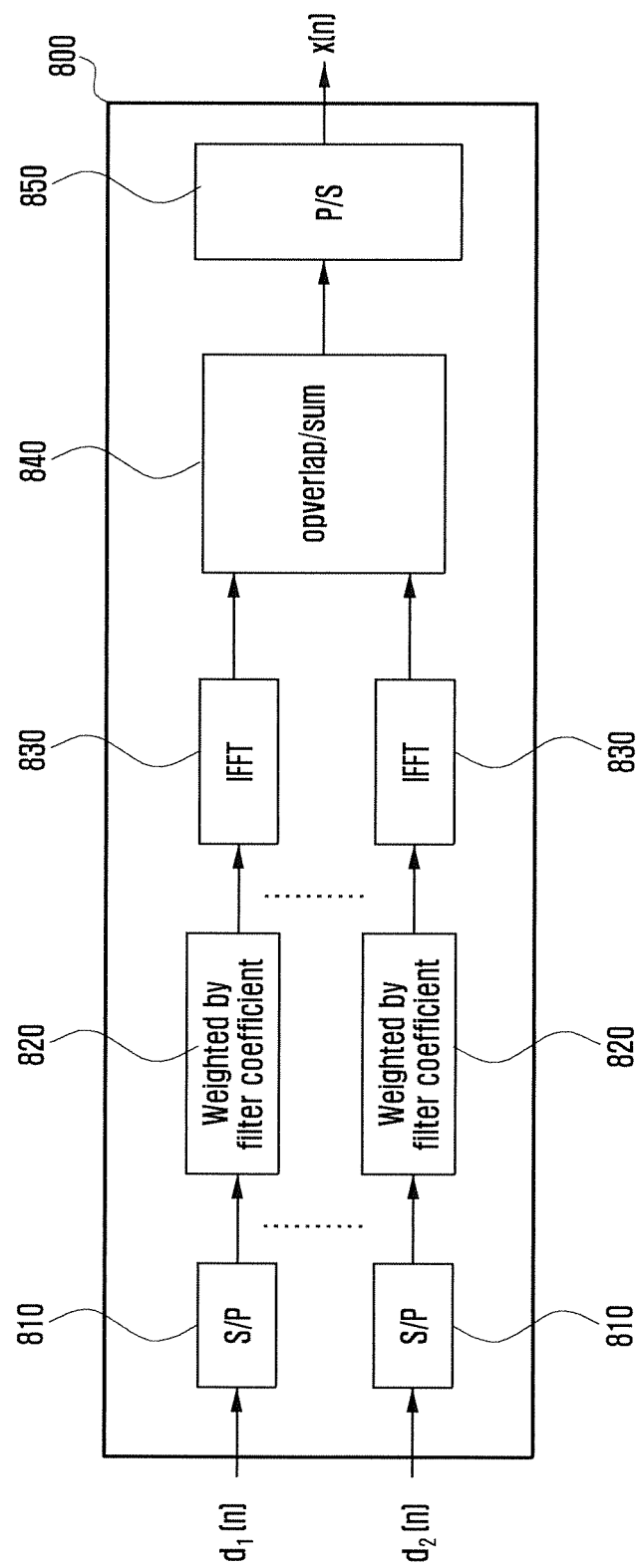
FIG. 14 is a block diagram showing a transmission apparatus according to the present invention.

FIG. 14 is a block diagram showing a transmission apparatus according to the present invention.

With reference to FIG. 14, a transmission apparatus 800 according to the present invention: converts input signals, divided into a number of groups d1(n) and d2(n), to parallel signals via a Serial-to-Parallel (S/P) converter 810; filters the converted signals as described above in the embodiments via a filtering unit 820; and applies IFFT to the filtered signals via an inverse fast Fourier transform (IFFT) 830. The transmission apparatus 800 performs an overlapping process for the signals via an overlap/sum block 840 and a Parallel-to-Serial (P/S) 850, and transmits the created signals via the communication unit.

Figure 15:
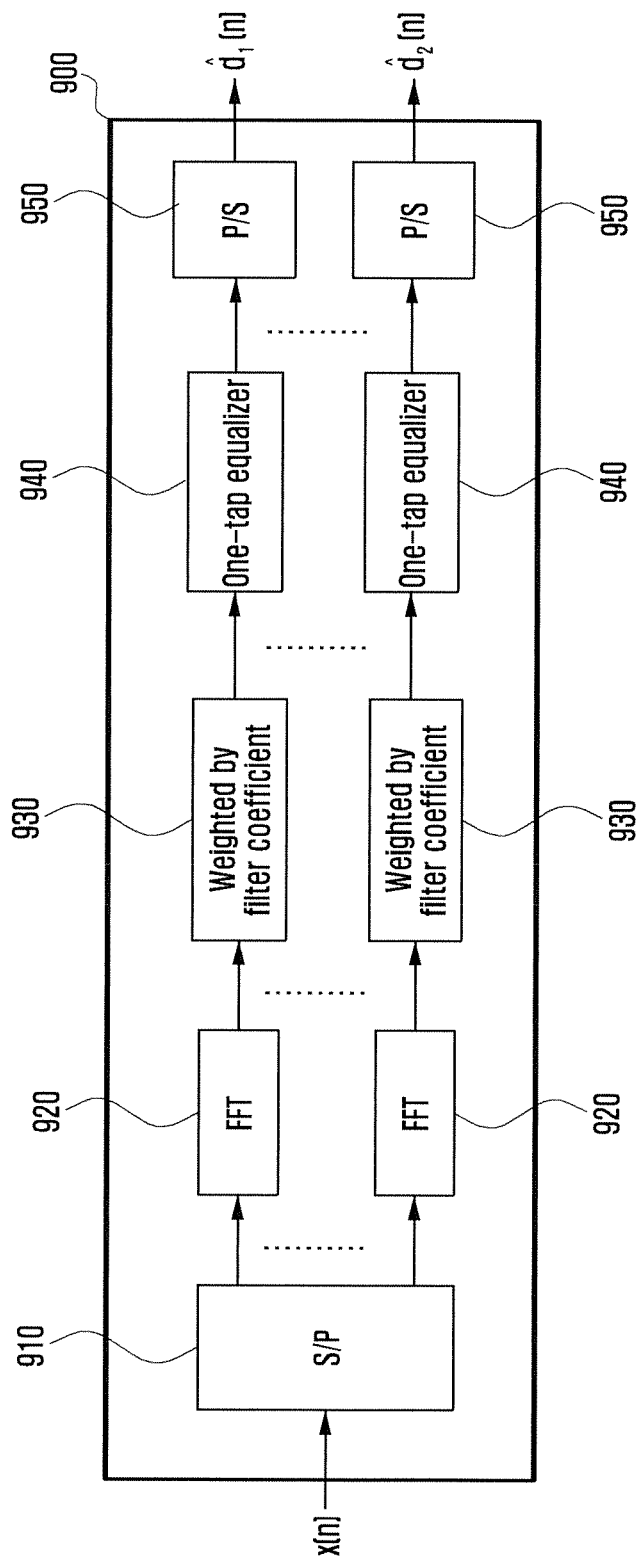
FIG. 15 is a block diagram showing a reception apparatus according to the present invention.

FIG. 15 is a block diagram showing a reception apparatus according to the present invention.

With reference to FIG. 15, a reception apparatus 900 according to the present invention: converts signal x(n), received via the communication unit, into parallel signals via the S/P converter 910; performs Fourier transform for the converted signals via a fast Fourier transform (FFT) 920; and filters the transformed signals as described above in the embodiment via the filtering unit 930. The reception apparatus 900 equalizes the signals via the frequency equalizer 940, and converts the equalized signals to serial signals via the P/S converter 950, thereby retrieving the corresponding signals.

The performance of the complex domain filter according to the present invention increases in proportion to the increase in the filter order K. However, as the filter order K increases, the IFFT and the FFT increase the size by K times, and this thus increases the degree of complexity, which is disadvantageous.

In order to reduce the degree of complexity, various embodiments of the present invention implement the filtering process, which has been performed in the frequency domain, in the time domain. That is, various embodiments of the present invention substitute the convolution in the frequency domain with the weighted sum in the time domain as described above in the embodiments with reference to FIGS. 14 and 15, thereby implementing the transmission and reception apparatuses without increasing the size of the IFFT and FFT.

It will be easily appreciated to those skilled in the art that various alternatives and modifications are possible from the essential features, ideas, of subject matter of the present invention, falling within the spirit and scope of the present invention. It should be understood that the embodiments of the present invention described in the description and drawings are merely provided to assist in a comprehensive understanding of the idea of the invention and are not suggestive of limitation. It should also be understood that the present invention is not limited to the embodiments. The scope of the present invention should be defined in the appended claims, including the embodiments, alterations and modifications.

The invention claimed is:

1. A transmission method of a Filter Bank Multicarrier (FBMC) communication system comprising:
spreading each of at least two Quadrature Amplitude Modulation (QAM) signals, divided into a number of groups, to a number of signals in a frequency domain;
intersecting at least one signal, overlapping with spread signals of adjacent QAM signals among the spread signals, with the spread signals of the adjacent QAM signals;
filtering, according to the groups, the spread signals at least one of which is intersected; and
overlapping the filtered, spread signals with each other in a time domain, and transmitting the signals.

2. The method of claim 1, wherein spreading each of at least two QAM signals comprises:
spreading QAM signals having length of M/2, where M is a length in the time domain, included in each of the groups, to signals of length M/2*2K allocated from index value 0 to index value K.

3. The method of claim 2, wherein intersecting at least one signal comprises:
intersecting signals, allocated from index value (K+1)/2 to index value K−1 among the spread signals, with the spread signals of the adjacent QAM signals.

4. The method of claim 1, wherein intersecting at least one signal comprises:
intersecting at least one of the spread signals with a signal that has the same index value as at least one of the spread signals of the adjacent QAM signals.

5. The method of claim 1, wherein filtering the spread signals comprises:
filtering the spread signals via filters that differ from each other and have complex relation with respect to each of the groups.

6. The method of claim 1, wherein filtering the spread signals comprises:
filtering the spread signals using a filter, H=[H2 H1 H0 H1 H2], for a first group; and
filtering the spread signals using a filter, G=[G2 G1 G0 G1 G2]=[jH2 jH1 jH0 jH1 jH2], for a second group.

7. The method of claim 1, wherein at least two QAM signals are divided so that the adjacent QAM signals belong to groups that differ from each other.

8. A reception method of a Filter Bank Multicarrier (FBMC) communication system comprising:
dividing received signals into a number of groups;
filtering the signals divided into groups; and
equalizing the filtered signals divided into groups in a frequency domain and retrieving at least one or two Quadrature Amplitude Modulation (QAM) signals,
each signal of the received signals is created by:
spreading each of the at least two QAM signals, divided into a number of groups, to a number of signals in the frequency domain;
intersecting at least one signal, overlapping with spread signals of adjacent QAM signals among the spread signals, with the spread signals of the adjacent QAM signals;
filtering, according to the groups, the spread signals at least one of which is intersected; and
overlapping the filtered, spread signals with each other in a time domain, and transmitting the signals.

9. The method of claim 8, wherein each signal of the received signals is created by:
spreading QAM signals of length M/2, where M is a length in the time domain, included in each of the groups, to signals of length M/2*2K allocated from index value 0 to index value K.

10. The method of claim 9, wherein each signal of the received signals is created by:
intersecting at least one of the spread signals with a signal that has the same index value as at least one of the spread signals of the adjacent QAM signals.

11. The method of claim 8, wherein filtering the spread signals comprises:
filtering the spread signals via filters that differ from each other and have complex relation with respect to each of the groups.

12. The method of claim 8, wherein filtering the spread signals comprises:
filtering the spread signals using a filter, H=[H2 H1 H0 H1 H2], for a first group; and
filtering the spread signals using a filter, G=[G2 G1 G0 G1 G2]=[jH2 jH1 jH0 jH1 jH2], for a second group.

13. The method of claim 8, wherein dividing received signals into a number of groups comprises:
dividing received signals into groups so that the adjacent QAM signals belong to the groups that differ from each other.

14. A transmission apparatus of a Filter Bank Multicarrier (FBMC) communication system comprising:
a filter configured to:
spread each of at least two Quadrature Amplitude Modulation (QAM) signals, divided into a number of groups, to a number of signals in a frequency domain;
intersect at least one signal, overlapping with spread signals of adjacent QAM signals among the spread signals, with the spread signals of the adjacent QAM signals; and
filter, according to the groups, the spread signals at least one of which is intersected; and
a transceiver configured to overlap the filtered, spread signals each other in a time domain, and transmitting the signals.

15. The transmission apparatus of claim 14, wherein the filter: spreads QAM signals of length M/2, where M is a length in the time domain, included in each of the groups, to signals of length M/2*2K allocated from index value 0 to index value K; and intersects signals, allocated from index value (K+1)/2 to index value K−1 among the spread signals, with the spread signals of the adjacent QAM signals.

16. The transmission apparatus of claim 14, wherein the filter intersects at least one signal of the spread signals with a signal that has the same index value as at least one of the spread signals of the adjacent QAM signals.

17. The transmission apparatus of claim 14, wherein the filter filters the spread signals, via a plurality of filters that differ from each other and have complex relation with respect to each of the groups.

18. A reception apparatus of a Filter Bank Multicarrier (FBMC) communication system comprising:
a transceiver configured to receive signals;
a filter configured to divide the received signals into a number of groups and filter the signals divided into groups; and
an equalizer configured to equalize the filtered signals in a frequency domain and retrieving at least one or two Quadrature Amplitude Modulation (QAM) signals,
each signal of the received signals is created by:
spreading each of the at least two QAM signals, divided into a number of groups, to a number of signals in the frequency domain;
intersecting at least one signal, overlapping with spread signals of adjacent QAM signals among the spread signals, with the spread signals of the adjacent QAM signals;
filtering, according to the groups, the spread signals at least one of which is intersected; and
overlapping the filtered, spread signals with each other in a time domain, and transmitting the signals.

19. The reception apparatus of claim 18, wherein each signal of the received signals is created by:
spreading QAM signals of length M/2, where M is a length in a time domain, included in each of the groups, to signals of length M/2*2K allocated from index value 0 to index value K; and
intersecting at least one signal of the spread signals with a signal that has the same index value as at least one of the spread signals of the adjacent QAM signals.

20. The reception apparatus of claim 18, wherein the filter filters the spread signals, via a plurality of filters that differ from each other and have complex relation with respect to each of the groups.

* * * * *

UNITED STATES PATENT AND TRADEMARK OFFICE
CERTIFICATE OF CORRECTION

PATENT NO. : 9,893,923 B2  
APPLICATION NO. : 15/505244  
DATED : February 13, 2018  
INVENTOR(S) : Hyungju Nam et al.

Page 1 of 1

It is certified that error appears in the above-identified patent and that said Letters Patent is hereby corrected as shown below:

On the Title Page

Item (73) Assignee, should read:
--SAMSUNG ELECTRONICS CO., LTD., Suwon-si (KR) and
INDUSTRY-ACADEMIC COOPERATION FOUNDATION YONSEI UNIVERSITY,
Seoul (KR)--

Signed and Sealed this
Sixteenth Day of October, 2018

Andrei Iancu
*Director of the United States Patent and Trademark Office*